United States Patent
Jayapalan

(10) Patent No.: US 11,283,872 B1
(45) Date of Patent: Mar. 22, 2022

(54) MEDIA TRIGGERED DEVICE CONTROL

(71) Applicant: United Services Automobile Association (USAA), San Antonio, TX (US)

(72) Inventor: Vijay Jayapalan, San Antonio, TX (US)

(73) Assignee: United Services Automobile Association, San Antonio, TX (US)

( * ) Notice: Subject to any disclaimer, the term of this patent is extended or adjusted under 35 U.S.C. 154(b) by 471 days.

(21) Appl. No.: 15/918,155

(22) Filed: Mar. 12, 2018

(51) Int. Cl.
| | |
|---|---|
| *H04L 67/12* | (2022.01) |
| *G06Q 20/22* | (2012.01) |
| *G06Q 50/18* | (2012.01) |
| *G06T 1/00* | (2006.01) |

(52) U.S. Cl.
CPC ............ *H04L 67/12* (2013.01); *G06Q 20/22* (2013.01); *G06Q 50/18* (2013.01); *G06T 1/0007* (2013.01)

(58) Field of Classification Search
CPC .... G06Q 30/0645; G06Q 10/02; G06Q 10/00; G06Q 20/18; G06Q 20/32; G06Q 30/0266; G06Q 10/10; G06Q 20/3224; G06Q 20/02; G06Q 20/206; G06Q 20/227; G06Q 20/4014; G06Q 20/40145; G06Q 30/0613; G06Q 20/3674; G06Q 20/382; G06Q 30/0261; G06Q 30/0284; G06Q 50/18; G06Q 20/22; H04L 67/12; G06T 1/0007
See application file for complete search history.

(56) References Cited

U.S. PATENT DOCUMENTS

| | | | | |
|---|---|---|---|---|
| 9,666,075 | B2 * | 5/2017 | Davies | G08G 1/149 |
| 10,650,651 | B1 * | 5/2020 | Roberts | G06K 9/00771 |
| 2016/0364129 | A1 * | 12/2016 | McLean | G06F 3/0481 |
| 2020/0014720 | A1 * | 1/2020 | Giura | H04L 63/20 |
| 2020/0101367 | A1 * | 4/2020 | Tran | B33Y 10/00 |
| 2021/0326974 | A1 * | 10/2021 | Leng | G06F 30/20 |

OTHER PUBLICATIONS

"Measurement and protocol for evaluating video and still stabilization systems", Etienne Cormier, Frédéric Cao*, Frédéric Guichard, Clément Viard, aDxO Labs, 92100 Boulogne Billancourt, France, Mar. 2012 pp. 1-11,https://corp.dxomark.com/wp-content/uploads/2017/11/2013-El-Stabilization_withcopyrigh (Year: 2012).*
Christidis et al., "Blockchains and Smart Contracts for the Internet of Things," IEEE Access, vol. 4, Dated May 10, 2016, pp. 1-12.
"Developing Blockchain Smart Contracts," IBM Cloud Docs, Dated Jan. 11, 2018, pp. 1-5.

* cited by examiner

*Primary Examiner* — Christopher Bridges
*Assistant Examiner* — Tony P Kanaan
(74) *Attorney, Agent, or Firm* — Fletcher Yoder, PC

(57) ABSTRACT

Methods, systems, and apparatus, including computer programs encoded on a computer storage medium, for accessing an electronic contract that includes a provision that is verifiable through control of a remote device. Sending instructions to the remote device that cause the remote device to obtain data representative of whether the provision in the electronic contract has been performed. Determining based on the data, that at least a portion of the provision has been performed. In response to determining that at least a portion of the provision has been performed, causing a term of the electronic contract to be at least partially executed.

20 Claims, 4 Drawing Sheets

MEDIA TRIGGERED DEVICE CONTROL

BACKGROUND

Smart contracts can be used to execute or monitor performance of parties in reference to internet centric operations. Smart contracts may also be referred to as digital contracts, self-executing contracts, or blockchain contracts. For example, smart contracts can define rules and penalties based on internet0centric agreements between two parties in a way similar to traditional paper contracts. For example, smart contracts can be used to monitor transfer and use of cryptocurrency. Improvements to smart contracts that permit verification of physical actions are desirable.

SUMMARY

Implementations of the present disclosure are generally directed to systems and methods for verifying the execution of electronic contract provisions using remote electronic devices or causing the execution of electronic contract provisions using remote electronic devices. More specifically, implementations obtain information from an electronic contract indicating that the execution of one or more provisions of the contract can be verified by data obtained from a remote electronic device. Implementations can determine the data required to verify execution of the provision(s). In some examples, a server system can control the remote electronic device to obtain the appropriate data for verifying execution of the provision(s) of the electronic contract. A term of the contract can be automatically executed in response to the verification data from the remote electronic device.

In general, innovative aspects of the subject matter described in this specification can be embodied in methods that include the actions of accessing an electronic contract that includes a provision that is verifiable through control of a remote device. Sending instructions to the remote device that cause the remote device to obtain data representative of whether the provision in the electronic contract has been performed. Determining based on the data, that at least a portion of the provision has been performed. In response to determining that at least a portion of the provision has been performed, causing a term of the electronic contract to be at least partially executed. Other implementations of this aspect include corresponding systems, apparatus, and computer programs, configured to perform the actions of the methods, encoded on computer storage devices. These and other implementations can each optionally include one or more of the following features.

In some implementations, the remote device is an IoT device.

In some implementations, the instructions provide commands to remotely operate the remote device during a timeframe in which the provision is expected to be executed.

In some implementations, n the instructions cause the remote device to capture video or images during a timeframe in which the provision is expected to be executed.

In some implementations, causing the term of the electronic contract to be at least partially executed includes causing a payment to be executed in response to verifying execution of the provision based on the data received from the remote device.

Some implementations include storing the data from the remote device that verifies execution of the provision in association with the electronic contract.

In some implementations, the electronic contract includes a blockchain, and storing the data from the remote device includes adding the data as a block to the blockchain.

In some implementations, determining that at least the portion of the provision has been performed includes performing image analysis on the data received from the remote device to verify execution of the provision in the electronic contract.

In some implementations, determining that at least the portion of the provision has been performed includes performing image analysis on the data received from the remote device to verify a partial execution of the provision in the electronic contract.

In some implementations, causing the term of the electronic contract to be at least partially executed includes, in response to verifying the partial execution of the provision, causing a partial payment to be executed.

In some implementations, causing the term of the contract to be at least partially executed includes sending, to a computing device associated with a party responsible for execution of the provision, a request to reschedule execution of the provision in response to determining that the provision only partially executed based on the data received from the remote device.

In some implementations, execution of the term of the electronic contract triggers a second provision of the electronic contract, the second provision being verifiable through control of a second remote device.

Some implementations include sending instructions to a second remote device that cause the second remote device to obtain data representative of whether the second provision in the electronic contract has been performed, and in response to data received from the second remote device, selectively causing a second term of the electronic contract to be executed.

In some implementations, execution of the term of the electronic contract triggers a provision of a second, different, electronic contract.

Some implementations include executing the provision of the second electronic contract by sending instructions to a second remote device to perform an operation.

These and other implementations can each provide one or more advantages. In some examples, implementations of the present disclosure improve the execution of smart contracts. For example, implementations may provide processes for automatically gathering evidence of completion of a smart contract provision using IoT devices. Implementations may improve the security of smart contracts. For example, implementations may store evidence of performance of a contract provision in distributed ledgers (e.g., blockchains). Implementations link smart contracts to IoT devices that are capable of verifying contract performance. Implementations link smart contracts to IoT devices that are capable of automatically executing terms of a contract.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Implementations of the present disclosure are generally directed to systems and methods for verifying the execution of electronic contract provisions using remote electronic devices or causing the execution of electronic contract provisions using remote electronic devices (e.g., IoT devices). More specifically, implementations obtain information from an electronic contract indicating that the execution of one or more provisions of the contract can be verified by data obtained from a remote electronic device. Implementations can determine the data required to verify execution of the provision(s). In some examples, a server system can control the remote electronic device to obtain the appropriate data for verifying execution of the provision(s) of the electronic contract. A term of the contract can be automatically executed in response to the verification data from the remote electronic device.

For example, a system can execute implementations of the present disclosure to verify execution of a homeowner's landscaping contract. The landscaping contract may include a provision that permits automatic verification through a web-camera at the homeowner's home. For example, the web-camera can have a view of the area of the yard that will be landscaped as part of the electronic contract between the homeowner and a landscaping company. For example, the electronic contract provision may permit the system to take remote control of the web-camera (e.g., by issuing instructions containing commands to control the camera over a network) in a manner that permits the system to obtain data from the web-camera to verify that the landscaper performed the agreed upon landscaping during a scheduled time. In some examples, the system can pan the camera appropriately during the scheduled landscaping time to verify the landscaper's presence at the property. In some implementations, the system can verify the completion of the landscaping based on images of the landscaper from the camera. In response to accessing data that verifies the completion of the contract provision (e.g., the landscaping), the system can automatically execute a payment term specified in the electronic contract.

Figure 1:
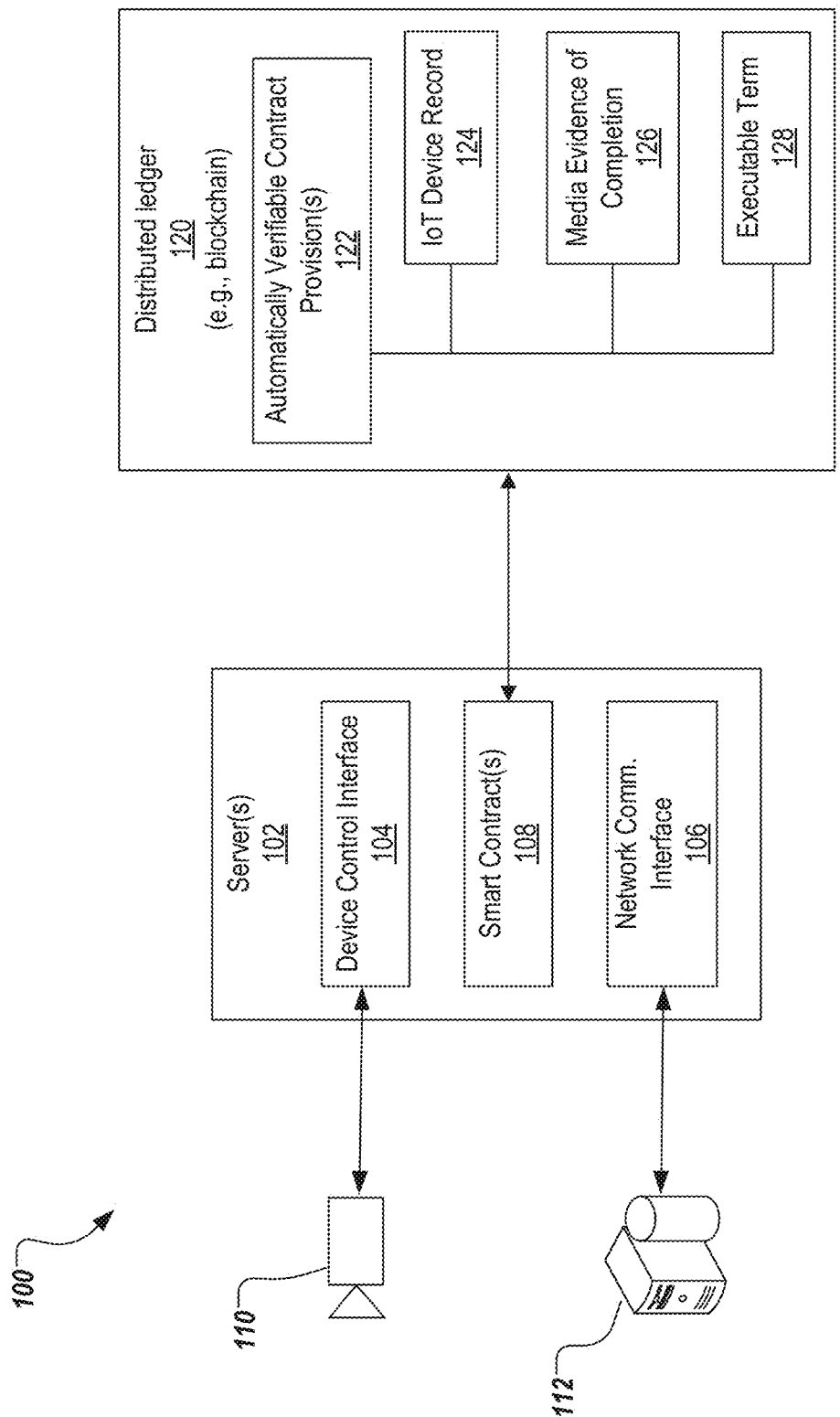
FIG. 1 depicts an example system in accordance with implementations of the present disclosure.

FIG. 1 depicts an example contract verification system (CVS) 100 that can execute implementations of the present disclosure. The CVS 100 includes one or more servers 102 in communication with one or more IoT devices 110 and one or more computing systems 112, 110. The servers 102 communicate with the IoT devices 110 and the computing systems 112 over one or more computer networks. The computer networks can include one network or combination of networks, such as a local area networks (LAN), wide area network (WAN), the Internet, a cellular network, a satellite network, or a combination thereof connecting any number of mobile clients, fixed clients, and servers.

The servers 102 are configured to automatically verify the execution of provisions in electronic contracts. For example, the servers 102 can include executable software that causes the servers 102 to verify execution of provisions in electronic contracts according to implementations of the present disclosure. The servers 102 can include one or more processors and a data store coupled to the processors storing the executable software.

The servers 102 can include a device control interface 104 and a network communication interface 106. The device control interface 104 provides and executes appropriate protocols for communicating with and, in some implementations, controlling operations of IoT devices 110. For example, device control interface 104 may include a database of scripts, device profiles, communication protocols, or a combination thereof for communicating with and/or controlling operations of a variety of different types and/or models of IoT devices 110. The network communication interface 106 provides and executes appropriate protocols for communicating computing systems 112, user computing devices (e.g., smartphones, laptops, personal computers, etc.) (not shown) over one or more computing networks.

The servers 102 may store or have access to one or more smart contracts 108. In some implementations, a smart contract may be stored as a distributed ledger 120 (as described in more detail below). In such implementations, the servers 102 may store or have access to portions of the smart contract 108. For example, the servers 102 may store of have access to portions of the smart contract 108 that are automatically verifiable, automatically executable, or both.

The IoT devices 104 can include, web cameras (e.g., for home security systems), smart door locks, smart appliances, object tracking devices (e.g., a smart key fob), smart plugs, smart light switches, smart thermostats, smart ventilations systems, smart window blinds, and home assistants. The IoT devices 110 may include, but are not limited to, one or more of the following: web-cameras; smart appliances (e.g., washers, dryers, refrigerators, ovens, dishwashers); in-home control systems (e.g., garage door openers, alarm systems, security systems, smart home systems); lighting devices (e.g., lamps, fixtures, etc.); utility systems that provide and/or control electric power, gas, water, sewage, heating and air conditioning, network access, and so forth, (e.g., water meters, water heaters, gas meters, electrical switch boxes, circuit breaker boxes, etc.); and/or portable or less portable computing devices (e.g., smartphones, tablet computers, electronic book readers, gaming systems, laptop computers, desktop computers, television set-top boxes, in-vehicle automotive computers or telematics devices, etc.). In some instances, the IoT devices 110 may be in a home or other building, or outside the building but in a same property lot as the building.

The computing systems 112 can be one or more a third party computing systems (e.g., a payment processing system). For example, computing systems 112 can include one or more network servers, database servers, or other computing devices.

In some implementations, a smart contract 108 can be stored as a distributed ledger 120. In some examples, the distributed ledger 120 can be a system of one or more blockchains. The distributed ledger 120 may be hosted on any suitable number of computing devices that operate as nodes in a distributed ledger system. Such nodes may be geographically distributed in any suitable number of locations.

The distributed ledger 120 may store any appropriate number of data records of various types, including automatically verifiable contract provisions (AVCP) 122. An AVCP 122 can include, but is not limited to including, one or more of the following: IoT device records 124, media evidence 126 of provision completion, and executable contract terms 128 associated with the AVCP 122. In addition, the AVCP 122 can include information describing the AVCP 122 itself including, but not limited to, which party of the contract must execute the provision, how the provision is to be executed, a date and or time that the provision is scheduled to be executed, instructions indicating data required from an IoT device to verify execution of the provision, instructions indicating a manner in which to control operations of an IoT device to obtain the required data, or any combination thereof.

IoT device records 124 may include information describing one or more IoT devices 110 that the CVS can use to verify execution of the AVCP 122. For example, the IoT device records 124 can include a list of one or more IoT devices 110 that are capable (e.g., by virtue of their location or operational characteristics) of collecting data to verify execution of the AVCP 122. In some examples, the IoT device records 124 identifies IoT devices 110 which parties to the contract have agreed to be used for collecting data to verify execution of the AVCP 122. Media evidence 126 of provision completion includes data that have been received from one or more IoT devices 110 and which provide verifiable evidence of the execution of the AVCP 122. For example, the media evidence 126 can include, but is not limited to, images, video, audio, digital signatures, or a combination thereof. In some implementations, the media evidence 126 is stored as a data block in a blockchain. The executable contract terms 128 includes information describing one or more terms of a smart contract 108 that can be automatically executed in response to verifying execution of the associated AVCP 122. The executable contract terms 128 can include, but is not limited to, information describing how to execute a contract term (e.g., payment information such as payment amount, payee and payer account information), proration instructions for partially executing the term in response to verifying only partial completion of the AVCP 122, information identifying any IoT devices 110 to be used for executing the term, or a combination thereof.

In some implementations, the distributed ledger 120 is a blockchain. A blockchain is a public or private ledger of all transactions that have been executed in one or more contexts (e.g., negotiable instrument transactions, digital currency transactions, access determinations, instances of providing access, etc.). A blockchain may grow as completed blocks are added with a new set of transactions. In some examples, a single block is provided from multiple transactions (e.g., multiple deposits of different checks by different people). In general, blocks are added to the blockchain in a linear, chronological order by one or more computing devices in a peer-to-peer network of interconnected computing devices that execute a blockchain protocol. In short, the peer-to-peer network can be described as a plurality of interconnected nodes, each node being a computing device that uses a client to validate and relay transactions. Each node maintains a copy of the blockchain, which is automatically downloaded to the node upon joining the peer-to-peer network. The blockchain protocol provides a secure and reliable method of updating the blockchain, copies of which are distributed across the peer-to-peer network, without use of a central authority.

Because all entities on the blockchain network may need to know all previous transactions to validate a requested transaction, all entities must agree on which transactions have actually occurred, and in which order. For example, if two entities observe different transaction histories, they will be unable to come to the same conclusion regarding the validity of a transaction. The blockchain enables all entities to come to an agreement as to transactions that have already occurred, and in which order. In short, and as described in further detail below, a ledger of transactions is agreed to based on the amount of work required to add a transaction to the ledger of transactions (e.g., add a block to the blockchain). Blockchains may also employ other protocols. In this context, the work is a task that is difficult for any single node (e.g., computing device) in the peer-to-peer network to quickly complete, but is relatively easy for a node (e.g., computing device) to verify.

The peer-to-peer network includes so-called miners (e.g., computing devices) that add blocks to a blockchain based on the blockchain protocol. In general, multiple miners validate transactions that are to be added to a block, and compete (e.g., perform work, as introduced above) to have their block added to the blockchain. Validation of transactions includes verifying digital signatures associated with respective transactions. For a block to be added to the blockchain, a miner must demonstrate a proof of work before their proposed block of transactions is accepted by the peer-to-peer network, and is added to the blockchain. A blockchain protocol includes a proof of work scheme that is based on a cryptographic hash function (CHF). An example CIF includes the secure hash algorithm 256 (SHA-256). In general, the CIF receives information as input, and provides a hash value as output, the hash value being of a predetermined length. For example, SHA-256 outputs a 256-bit (32-byte, 64-character) hash value. In some examples, the hash value is a one-way hash value, in that the hash value cannot be 'un-hashed' to determine what the input was. The blockchain protocol can require multiple pieces of information as input to the CHF. For example, the input to the CIF can include a reference to the previous (most recent) block in the blockchain, details of the transaction(s) that are to be included in the to be created block, and a nonce value (e.g., a random number used only once).

Multiple nodes may compete to hash a set of transactions and provide the next block that is to be added to the blockchain. The blockchain protocol provides a threshold hash to qualify a block to be added to the blockchain. For example, the threshold hash can include a predefined number of zeros (0's) that the hash value must have at the beginning (e.g., at least the first four characters of the hash value must each be zero). The higher the number of zeros, the more time-consuming it is to arrive at a qualifying hash value.

In accordance with the blockchain protocol, each miner in the peer-to-peer network receives transaction information for one or more transactions that are to be included in a block that is to be added next in the blockchain. Each miner provides the reference to the previous (most recent) block in the blockchain, details of the transaction(s) that are to be included in the to-be-created block, and the nonce value to the CIF to provide a hash value. If the hash value does not meet the threshold hash (e.g., the first four characters of the hash value are not each zero), the miner starts again to provide another hash value. If the hash value meets the threshold hash (e.g., at least the first four characters of the hash value are each zero), the respective miner successfully created the next block that is to be added to the blockchain. Consequently, the respective miner's block is broadcast across the peer-to-peer network. All other miners cease work (because one miner was already successful), and all copies of the blockchain are updated across the peer-to-peer network to append the block to the blockchain. Each miner may be required to produce hundreds or thousands of hash values, before any one miner provides a qualifying hash value (e.g., at least the first four characters of the hash value are each zero).

In some cases, the distributed ledger or blockchain system can include one or more sidechains. A sidechain can be described as a blockchain that validates data from other blockchains. In some examples, a sidechain enables ledger assets (e.g., a digital currency) to be transferred between multiple blockchains. The blockchain may be a public blockchain, such that data stored on the blockchain is generally accessible. The blockchain may be a private blockchain, such that the stored data is accessible only to authorized individuals and/or processes on the blockchain.

In operation, the CVS servers 102 identify an AVCP 122 in a smart contract 108. The CVS servers 102 identify one or more IoT devices 110 that can be used to verify execution of the AVCP 122. For example, the CVS servers 102 can identify the IoT devices 110 from an IoT device record 124 associated with the AVCP 122. The CVS servers 102 determine what data to collect from the IoT devices 110 to verify execution of the AVCP 122 and, in some implementations, how to control the IoT devices 110 to collect the required data. The CVS servers 102 provide instructions to the identified IoT devices 110 to obtain the required data to verify execution of the AVCP 122. For example, the CVS servers 102 may transmit instructions to an IoT device 110 to control and obtain data from the IoT device 110 at a scheduled time for completion of the AVCP 122. The IoT devices 110 respond to the instructions from the CVS servers 102, and sends the requested data back to the CVS servers 102. The CVS servers 102 determine, from the data from the IoT devices 110, whether the AVCP 122 was executed. For example, the CVS servers 102 can use image or video processing techniques to identify actions performed by one of the parties of the contract to complete the provision. In response to verifying execution of the AVCP 122, the CVS servers 102 can automatically cause an executable contract term 128 that was dependent upon completion of the AVCP 122 to be executed. For example, the CVS servers 102 can send instructions to a payment system (e.g., computing system 112) to execute payment for completion of the AVCP 122.

As a first example, a CVS 100 can be used to verify completion of a homeowner's landscaping contract. An example smart landscaping contract may include an AVCP 122 related to completion of the agreed upon landscaping. For example, a landscaping AVCP 122 may indicate that a landscaper is scheduled to plant bushes in a homeowner's front yard on an agreed upon date. The AVCP 122 may authorize images from the homeowner's front door security camera as proper evidence to verify completion of the landscaping and provide payment information to execute payment upon verifying completion of the landscaping.

The CVS servers 102 can analyze the smart landscaping contract to identify any AVCPs 122 that are contained in the contract. For example, the CVS servers 102 can identify the AVCP 122 directed to verifying that the landscaper plants bushes for the homeowner. The CVS servers 102 evaluate the identified AVCPs 122 to determine attributes of the AVCP 122 that are relevant to automatically verifying execution of the AVCP 122. For example, as noted above, the AVCP 122 may indicate the contract party is responsible to complete the AVCP 122, one or more IoT devices 110 to be used to verify completion of the AVCP 122, the data required to provide evidence of completion of the AVCP 122, a scheduled timeframe for completion of the AVCP 122, instructions indicating how to control the IoT devices 110 to collect the required data, or a combination thereof. For example, the landscaping AVCP 122 may indicate that that the landscaper is scheduled to plant the bushes on Apr. 15, 2018 between 9:00 AM and 12:00 PM and that images and/or video from the homeowner's front door security camera can be used as evidence to verify completion.

The CVS servers 102 can send instructions to the homeowner's front door security camera (e.g., IoT device 110) at 9:00 AM on Apr. 15, 2018 to begin acquiring images or video of the homeowner's front yard. In response to the instructions, the securing camera can transmit the images or video back to the CVS servers 102. The CVS servers 102 can determine whether the images or video provide evidence that the landscaper completed the AVCP 122 by planting the bushes. For example, the CVS servers 102 can analyze the received images or video to determine if the landscaper arrived at the homeowner's house and planted the bushes. For example, the CVS servers 102 can implement digital image processing techniques to compare identify two new bushes in the home owner's front yard. In some examples, the CVS servers 102 can identify the landscaper and/or the new bushes using image processing techniques including, but not limited to, facial detection, edge detection, correlation between multiple images, greyscale matching, gradient matching, blob detection, ridge detection, or a combination thereof.

If the CVS servers 102 determine that the AVCP 122 has been completed (e.g., the bushes have been planted) based on the images or video from the security camera, then the CVS servers 102 can send instructions to a payment processing system (e.g., computing system 112) to execute a payment from the homeowner to the landscaper. If the CVS servers 102 determine that the AVCP 122 has not been completed (e.g., the bushes were not planted), then the CVS servers 102 will not execute the payment. In some implementations, the CVS servers 102 can coordinate a modification of the AVCP 122 in the smart contract. For example, the CVS servers 102 can send a notification to computing devices associated with the landscaper and the homeowner to reschedule the services associated with the AVCP 122.

In some implementations, the CVS servers 102 store the images or video as proof that the AVCP 122 was properly executed.

In some implementations, the AVCP 122 may include camera control information that permits the CVS servers 102 to control the security camera to provide view of the region of the homeowner's front yard where the bushes are to be planted. For example, the control information may include position coordinates for controlling a servo motor on the camera to pan the camera into a proper position. As another example, the control information may include a digital image of the desired camera view previously captured from the security camera. The AVCP 122 can remotely control the security camera to pan the camera to a position that produces images that correspond with the image of the desired camera view.

In some implementations, the CVS servers 102 can determine a partial completion of an AVCP 122. For example, in reference to the landscaping example discussed above, the CVS servers 102 can determine, through object recognition, that images from the homeowner's security camera show that the landscaper planted only one of two bushes. In response to determining that the AVCP 122 was only partially completed, the CVS servers 102 may issue only a partial payment to the landscaper. In some implementations, the CVS servers 102 can coordinate with the party responsible to complete the AVCP 122 a schedule to finish the partially completed AVCP 122. For example, the CVS servers 102 can send a notification to computing devices associated with the landscaper and the homeowner to schedule completion of the services associated with the AVCP 122.

In some implementations, the CVS server 102 can control multiple IoT devices 110 to verify completion of an AVCP 122. For example, the IoT device record 124 may indicate multiple IoT devices 110 that can (or should) be used to verify completion of an AVCP 122. For instance, with reference to a retail store context, an AVCP 122 may require a product distributor to stock shelves of a retail store with products. The AVCP 122 may indicate multiple cameras throughout the store that are positioned to capture evidence showing completion of the AVCP 122. The CVS servers 102 can send instructions to the individual cameras to obtain images of different shelves in the store. The images from each different camera may provide evidence show completion of different aspects of the AVCP 122. For example, a first camera may show whether the product distributor stocked products in a frozen food section, while a second camera may show whether the product distributor stocked products in a cereal aisle.

In some implementations, verifying one AVCP may trigger the execution of another AVCP in a smart contract. For example, a smart contract 108 may define multiple AVCPs 122 some of which are linked. As one example, a smart contract may be directed to an agreement between a homeowner or business (e.g., a restaurant) and a grocery delivery service. A first AVCP in the smart contract may provide for automatically placing an order with the grocery delivery service when one or more IoT devices 110 indicate that the homeowner or business has run out of a certain grocery items. For example, the first AVCP may instruct the CVS servers 102 to use data from a smart refrigerator, a camera in a pantry, or a combination thereof to determine when a homeowner runs out or is low on eggs, milk, and cheese (based on the smart refrigerator) and low on bread and cereal (based on the pantry camera). If CVS servers 102 determine the homeowner has run low on a set of groceries as defined in the AVCP, then the CVS servers 102 can automatically place an order for the groceries with the grocery delivery service. For example, the automatic order may be defined as an executable term 128 of the first AVCP. Furthermore, the automatic order may be linked to a second AVCP. The second AVCP may provide instructions for verifying completion of the order (e.g., delivery of the groceries to the homeowner) using a security camera at the homeowner's front door. For example, the CVS servers 102 can obtain images and/or control the security camera at the front door to determine when the groceries are delivered and, in response, execute a payment to the delivery service.

Figure 2:
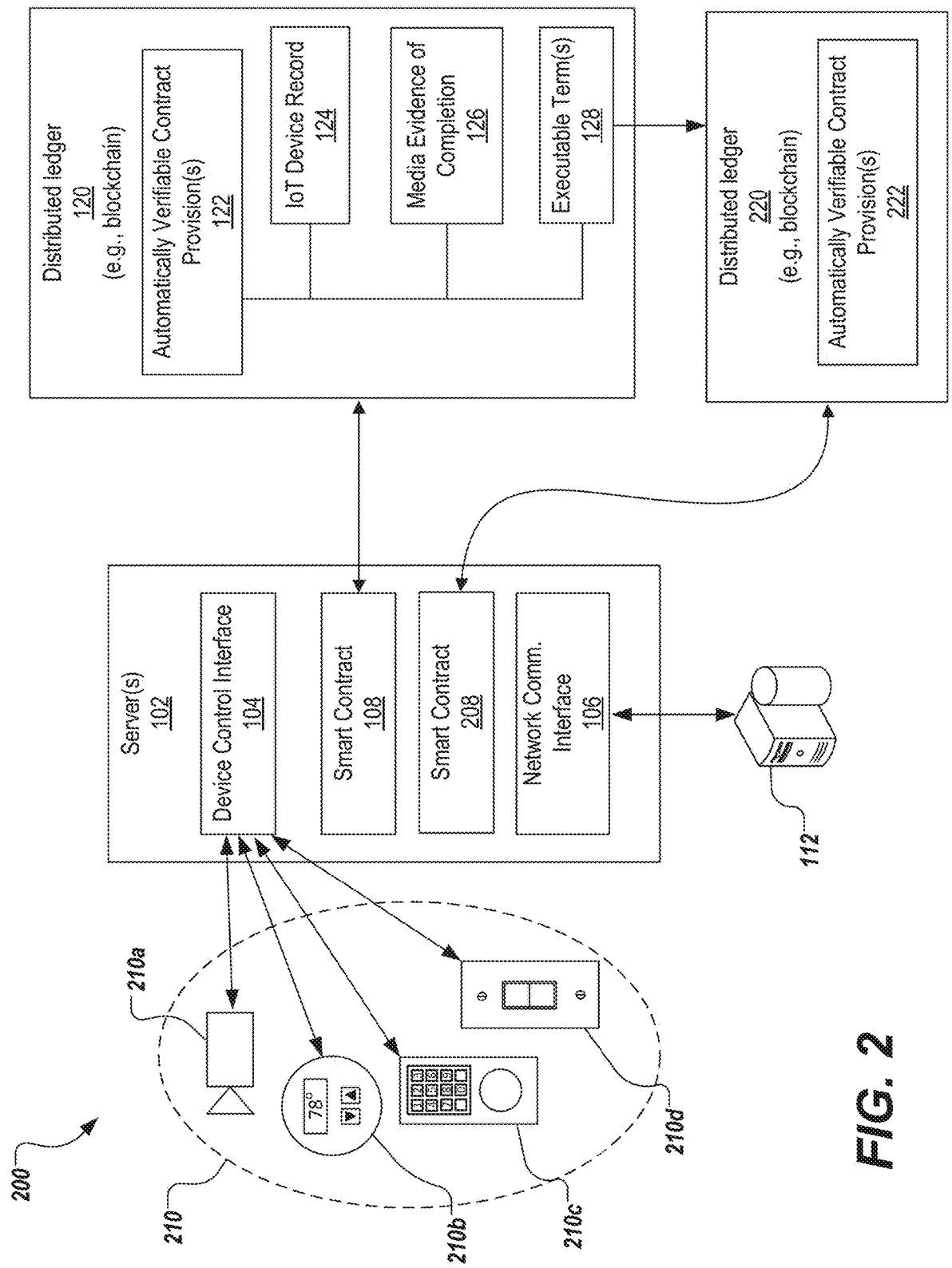
FIG. 2 depicts another graphical representation of an example system in accordance with implementations of the present disclosure.

FIG. 2 depicts a graphical representation of another example CVS 200 in accordance with implementations of the present disclosure. FIG. 2 illustrates an example system in which a smart contract can be used to control operations of IoT devices. The CVS 200 depicted in FIG. 2 will be described in reference to the example context of a smart vacation rental contract, however, the CVS 200 features discussed below may be applicable to various other contexts.

FIG. 2 illustrates a CVS 200 that is similar to CVS 100 of FIG. 1. The CVS servers 102 are in communication with a plurality of smart home IoT devices 210. For example, the smart home IoT devices 210 can include, but are not limited to, a security camera system 210*a*, a smart thermostat 210*b* (e.g., a smart HVAC system), one or more smart door locks 210*c*, and one or more smart light switches 210*d*.

In some implementations, the terms of a smart contract 108 can be used to control operations of one or more IoT devices 210 in performance of the contract. For example, a smart contract 108 for a vacation rental property may define a unique lock combination for a renter. An AVCP 122 of the smart contract 108 can be used update the code of a smart lock 210*c* prior to the arrival of the renter and reset the lock code after the renter leaves. For example, the AVCP can be triggered based on the arrival date of the renter as defined in the smart contract 108. For example, the provision is automatically executed on the rental date specified in the smart rental contract. On the beginning date of the rental contract, the CVS servers 102 can send instructions to the smart lock 210*c* at the rental property to update the entry code to one specified in the contract. Thus, a unique code can be automatically set for different rental contracts and the locks automatically changed for each new renter.

In some implementations, the smart contract can use the updated lock code as a verification for another AVCP 122 in the smart rental contract 108. For example, the renter's first use of the unique code to unlock the smart lock 210*c* can server as verification that the renter has arrived at the property. Thus, the smart lock 210*c* can send information indicating the renter's arrival to the CVS servers 102 to store as evidence of the time and date of the renter's arrival at the property. In some examples, the CVS servers 102 can execute payment for the vacation rental in response to receiving the first use of the unique code.

In some implementations, the smart contract 108 can be used to control IoT devices 210 that are not directly related to provisions in the contract. For example, an AVCP 122 can be used to automatically prepare the vacation home for the renter's arrival. For instance, an owner of the vacation home may include additional executable terms 128 in the AVCP 122 for controlling door locks (discussed above). The additional executable terms 128 may not be required by the contract, but may be desired by the property owner to enhance the experience of the renters. For example, the additional executable terms may include, setting a smart thermostat 210*b* to a comfortable temperature for the renter's arrival, turning on smart lights 210*d* in property prior to the renter's arrival, and turning off an internal security camera 210*a* for privacy prior to the renter's arrival. The CVS servers 102 can, for example, send appropriate instructions to the smart thermostat 210*b*, smart light 210*d*, and security camera 210*a* in accordance with the smart contract 108.

In some implementations, the completion of an AVCP 122 in one smart contract 108 can be linked to an AVCP 222 in a second smart contract 208 (e.g., distributed ledger 220). For example, referring to the vacation rental example, an AVCP 122 to verify the departure of a renter may be linked to a smart contract 208 with a cleaning service. For example, the CVS servers 102 can verify the departure of the renter in accordance with a departure AVCP based on receiving a signal from the smart lock 210*c* indicating that the renter has locked the door on their scheduled departure date and data from an external security camera 210*a* indicating the renter's vehicle has left the property. In response, the departure AVCP may include a first executable term 128 to disable the renter's unique door lock code and a second executable term 128 that links to a smart contract 208 with the cleaning service. A related AVCP 222 in the smart contract 208 with the cleaning service may provide that the upon verification that a renter has departed from the rental property, the cleaning service will be informed of the departure and the smart lock 210c will be updated with an entry code that is unique to the cleaning service. The CVS servers 102 can execute the first executable term 128 by sending instructions to the smart lock 210c to disable the renter's entry code. The CVS servers 102 can execute the second executable term and the AVCP 222 of the cleaning service contract 208 by sending a notification to the cleaning service that the property is available for cleaning and sending instructions to the smart lock 210c to reset the entry code to the cleaning service's unique entry code. The notification can be, for example, an e-mail, SMS message, phone message, etc. For example, the smart contracts 108 and 208 may provide for increased security for the rental property by permitting automatic updates to smart home IoT devices 210 based on the execution of various AVCPs 122, 222 in the smart contracts.

Figure 3:
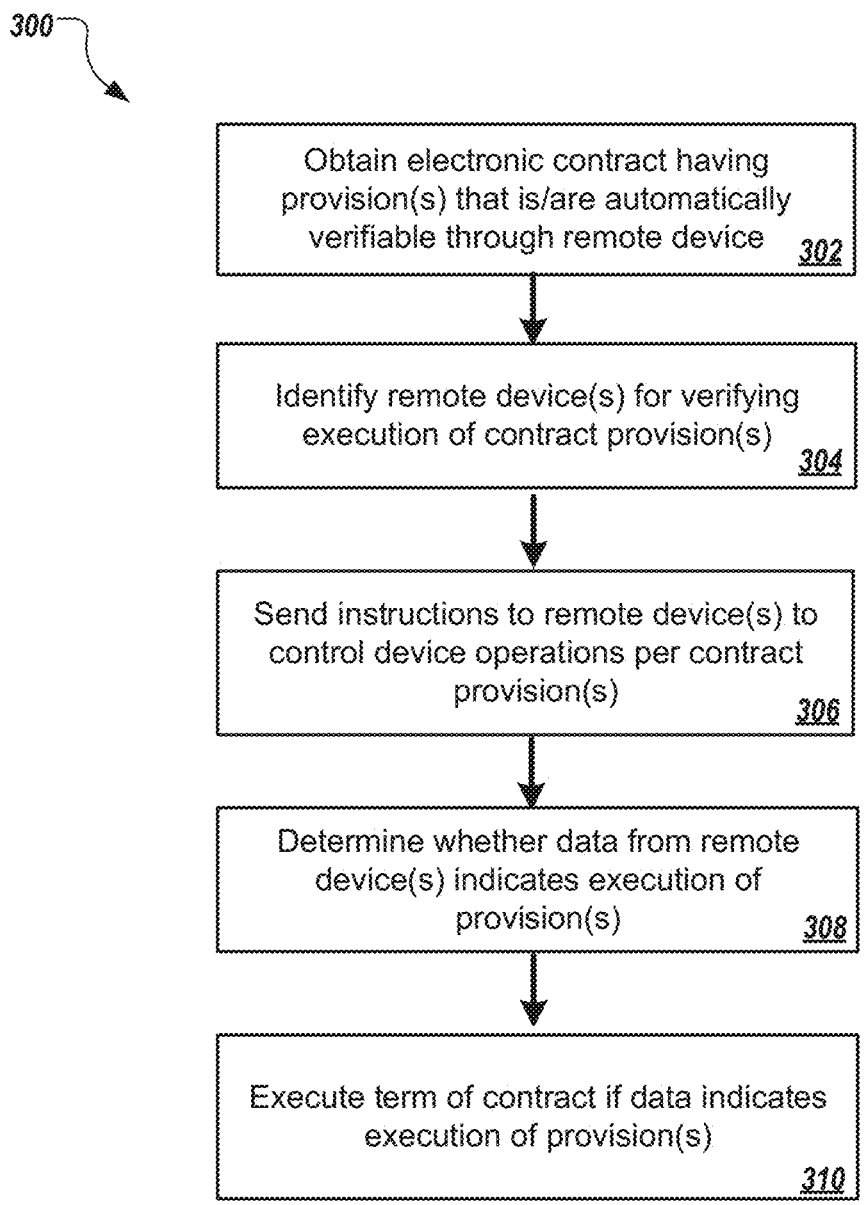
FIG. 3 depicts an example process that can be executed in accordance with implementations of the present disclosure.

FIG. 3 depicts an example process 300 that can be executed in accordance with implementations of the present disclosure. The example process 300 can be implemented, for example, by the example CVS 100 of FIG. 1 or CVS 200 of FIG. 2. In some examples, the example process 300 can be provided by one or more computer-executable programs executed using one or more computing devices. For example, the example process 300, or portions thereof, can be provided by one or more programs executed by a computing system (e.g., CVS servers 102 of FIGS. 1 and 2).

The system obtains an electronic contract that includes a provision that is automatically verifiable through control of a remote device (302). For example, the system can store an electronic contract (e.g., a smart contract) in a local data store associated with the system and access the electronic contract from the data store. The system can access a smart contract from a remote data store.

The system identifies a remote device for verifying execution of the contract provision (304). For example, the electronic contract can include one or more automatically verifiable contract provisions (AVCP). The AVCPs can include a device record (e.g., an IoT device record) that identifies one or more remote devices that can be used to verify the execution of the provision. For example, the device record may include information describing one or more IoT devices that the system can control to verify execution of the provision.

The system sends instructions to the remote device to control the device operations per the contract provision (306). For example, the system can send instructions to the remote device that cause the remote device to obtain data representative of whether the provision in the electronic contract has been performed. For example, the instructions can cause the remote device to capture data at a specified time and transmit the captured data to the system. For example, the instructions can cause the remote device to capture images or video at a specified time and transmit the images or video to the system. The instructions can control reposition the remote device to configure the field of view of the remote device to capture images of a region applicable to the electronic contract. In some examples, the instructions can control an operation of the remote device. For example, the instructions can change a code associated with a smart lock.

The system determines whether data from the remote device indicates execution of the provision (308). For example, the system can implement digital image processing techniques to determine whether the images from the remote device provide evidence that the provision has been executed. For example, the system can use object recognition techniques to identify the presence or absence of objects defined within the electronic contract. For example, the system can verify the presence of packages delivered to a front door, the presence of service personnel at schedule times, the presence of new products placed on a shelf, the presence of new equipment installed at a worksite, etc. As another example, the system can verify the removal of objects such as the removal of food items from a smart refrigerator, the removal of a package scheduled for pickup, the removal of rental equipment from a rental lot, etc. In some implementations, the operation of an IoT device may serve as evidence that a contract provision has been executed. For example, the operation of a smart lock using a unique entry code may indicate at that a renter has arrived at a rental property. The operation of a smart key in a rental vehicle may indicate that a customer has picked up a rental vehicle.

The system executes a term of the contract if the data indicates execution of the provision (310). For example, in response to determining that at least a portion of the provision has been performed, the system can send instructions to a third party payment processing system to execute a payment in the electronic contract. In some implementations, if the system determines that the provision was only partially competed, the system can send instructions to make only a partial payment. In some implementations, if the system determines that the provision was not executed the system can coordinate a modification of the smart contract. For example, the system can send a notification to computing devices associated with the landscaper and the homeowner to reschedule the services associated with the electronic contract provision.

Figure 4:
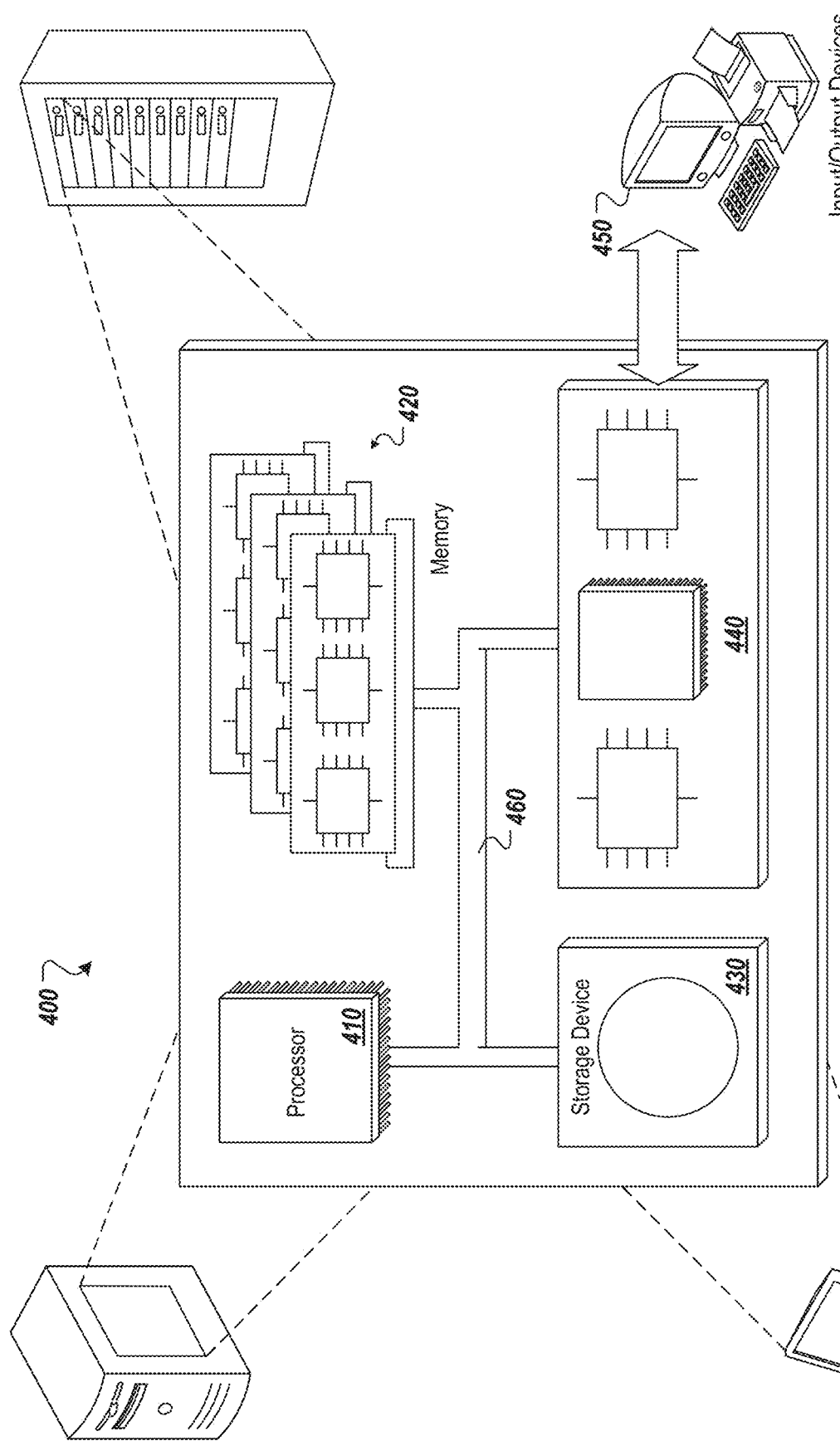
FIG. 4 depicts an example computing system, according to implementations of the present disclosure.

FIG. 4 depicts an example computing system, according to implementations of the present disclosure. The system 400 may be used for any of the operations described with respect to the various implementations discussed herein. For example, the system 400 may be included, at least in part, in one or more of the user device(s) 118(1) and/or 118(2), the server device(s) 110, the node(s) that host the distributed ledger 120, and/or other computing device(s) or system(s) described herein. The system 400 may include one or more processors 410, a memory 420, one or more storage devices 430, and one or more input/output (I/O) devices 450 controllable via one or more I/O interfaces 440. The various components 410, 420, 430, 440, or 450 may be interconnected via at least one system bus 460, which may enable the transfer of data between the various modules and components of the system 400.

The processor(s) 410 may be configured to process instructions for execution within the system 400. The processor(s) 410 may include single-threaded processor(s), multi-threaded processor(s), or both. The processor(s) 410 may be configured to process instructions stored in the memory 420 or on the storage device(s) 430. For example, the processor(s) 410 may execute instructions for the various software module(s) described herein. The processor(s) 410 may include hardware-based processor(s) each including one or more cores. The processor(s) 410 may include general purpose processor(s), special purpose processor(s), or both.

The memory 420 may store information within the system 400. In some implementations, the memory 420 includes one or more computer-readable media. The memory 420 may include any number of volatile memory units, any number of non-volatile memory units, or both volatile and non-volatile memory units. The memory 420 may include read-only memory, random access memory, or both. In some examples, the memory 420 may be employed as active or physical memory by one or more executing software modules.

The storage device(s) 430 may be configured to provide (e.g., persistent) mass storage for the system 400. In some implementations, the storage device(s) 430 may include one or more computer-readable media. For example, the storage device(s) 430 may include a floppy disk device, a hard disk device, an optical disk device, or a tape device. The storage device(s) 430 may include read-only memory, random access memory, or both. The storage device(s) 430 may include one or more of an internal hard drive, an external hard drive, or a removable drive.

One or both of the memory 420 or the storage device(s) 430 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 400. In some implementations, the CRSM may include a data store that provides storage of computer-readable instructions or other information in a non-transitory format. The CRSM may be incorporated into the system 400 or may be external with respect to the system 400. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 410 and the memory 420 may be supplemented by, or incorporated into, one or more application-specific integrated circuits (ASICs).

The system 400 may include one or more I/O devices 450. The I/O device(s) 450 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 450 may also include one or more output devices such as a display, LED(s), an audio output device (e.g., a speaker), a printer, a haptic output device, and so forth. The I/O device(s) 450 may be physically incorporated in one or more computing devices of the system 400, or may be external with respect to one or more computing devices of the system 400.

The system 400 may include one or more I/O interfaces 440 to enable components or modules of the system 400 to control, interface with, or otherwise communicate with the I/O device(s) 450. The I/O interface(s) 440 may enable information to be transferred in or out of the system 400, or between components of the system 400, through serial communication, parallel communication, or other types of communication. For example, the I/O interface(s) 440 may comply with a version of the RS-232 standard for serial ports, or with a version of the IEEE 1284 standard for parallel ports. As another example, the I/O interface(s) 440 may be configured to provide a connection over Universal Serial Bus (USB) or Ethernet. In some examples, the I/O interface(s) 440 may be configured to provide a serial connection that is compliant with a version of the IEEE 1394 standard.

The I/O interface(s) 440 may also include one or more network interfaces that enable communications between computing devices in the system 400, or between the system 400 and other network-connected computing systems. The network interface(s) may include one or more network interface controllers (NICs) or other types of transceiver devices configured to send and receive communications over one or more communication networks using any network protocol.

Computing devices of the system 400 may communicate with one another, or with other computing devices, using one or more communication networks. Such communication networks may include public networks such as the internet, private networks such as an institutional or personal intranet, or any combination of private and public networks. The communication networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 400 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A system, comprising:
a server system; and
computer memory communicatively coupled to the server system having instructions stored thereon which, when executed by the server system, causes the server system to perform operations comprising:
   determining whether at least one individual is within a viewing range of at least one of one or more remote devices during an expected period of time, the one or more remote devices configured to monitor one or more properties of an area;
   identifying an electronic contract in response to determining that the at least one individual is within the viewing range of the at least one of the one or more remote devices during the expected period of time;
   accessing the electronic contract comprising one or more provisions for fulfilling the electronic contract and one or more terms for executing one or more payments, wherein the one or more provisions are indicative of:
      the one or more remote devices for verifying that the one or more provisions are fulfilled;
      reference image data previously acquired by the one or more remote devices; and
      one or more control operations of the one or more remote devices for adjusting one or more first positions of the one or more remote devices to obtain image data representative of whether the one or more provisions are fulfilled during a scheduled timeframe, wherein the one or more remote devices are adjusted by moving from the one or more first positions to one or more second positions that enable the one or more remote devices to obtain the image data corresponding to the reference data;
   sending instructions to the one or more remote devices in response to determining that the at least one individual is within the viewing range of the at least one of the one or more remote devices during the expected period of time, the instructions configured to cause the one or more remote devices to:
      move to the one or more second positions that enable the one or more remote devices to obtain the image data that corresponds to the reference image data in accordance with the one or more control operations; and
      acquire the image data during the scheduled timeframe;
   receiving the image data from the one or more remote devices;
   modifying the electronic contract to include the image data;
   determining, based on a comparison between the image data and the reference image data previously acquired by the one or more remote devices, that the one or more provisions have been fulfilled; and
   in response to determining that the one or more provisions have been fulfilled, causing the one or more terms to be executed, wherein the one or more terms are executed by sending one or more commands to one or more payment systems to issue the one or more payments to an account associated with a fulfiller of the one or more provisions.

2. The system of claim 1, wherein the one or more remote devices comprise one or more IoT devices.

3. The system of claim 1, wherein the instructions cause the server system to perform operations comprising providing one or more additional commands to remotely operate the one or more remote devices during the scheduled timeframe in which the one or more provisions are expected to be fulfilled.

4. The system of claim 1, wherein the instructions cause the server system to perform the operations comprising sending one or more additional commands to the one or more remote devices to capture video or images during the scheduled timeframe in which the one or more provisions are expected to be fulfilled.

5. The system of claim 1, wherein the operations further comprise storing the image data from the one or more remote devices that verify fulfilling of the one or more provisions in association with the electronic contract.

6. The system of claim 5, wherein the electronic contract comprises a blockchain, and wherein storing the image data from the one or more remote devices comprises adding the image data as a block to the blockchain.

7. The system of claim 1, wherein the server system is configured to determine that the one or more provisions have been fulfilled by performing image analysis on the image data received from the one or more remote devices to verify fulfillment of the one or more provisions in the electronic contract.

8. The system of claim 1, wherein the server system is configured to determine that the one or more provisions have been fulfilled by performing image analysis on the image data received from the one or more remote devices to verify one or more partial fulfillings of the one or more provisions in the electronic contract.

9. The system of claim 8, wherein causing the one or more terms of the electronic contract to be executed comprises, in response to verifying the one or more partial fulfillings of the one or more provisions, causing one or more partial payments to be executed.

10. The system of claim 1, wherein causing the one or more terms of the electronic contract to be executed comprises sending, to a computing device associated with a party responsible for fulfillment of the one or more provisions, a request to reschedule fulfillment of the one or more provisions in response to determining, based on the image data received from the one or more remote devices, that the one or more provisions are only partially fulfilled.

11. The system of claim 1, wherein execution of the one or more terms of the electronic contract comprises triggering a provision of a second electronic contract.

12. The system of claim 11, wherein the operations further comprise executing the provision of the second electronic contract by sending instructions to a second remote device to perform an operation.

13. A computer implemented method executed by at least one processor, the method comprising:
   determining whether at least one individual is within a viewing range of at least one of one or more remote devices during an expected period of time, the one or more remote devices configured to monitor one or more properties of an area;
   identifying an electronic contract in response to determining that the at least one individual is within the viewing range of the at least one of the one or more remote devices during the expected period of time;
   accessing, by the at least one processor, the electronic contract comprising one or more provisions for fulfilling the electronic contract and one or more terms for executing one or more payments, wherein the one or more provisions are indicative of:
- the one or more remote devices for verifying that the one or more provisions are fulfilled;
- reference image data previously acquired by the one or more remote devices; and
- one or more control operations of the one or more remote devices for adjusting one or more first positions of the one or more remote devices to obtain image data representative of whether the one or more provisions are fulfilled during a scheduled timeframe;

sending instructions to the one or more remote devices in response to determining that the at least one individual is within the viewing range of the at least one of the one or more remote devices during the expected period of time, the instructions configured to cause the one or more remote devices to:
- move from the one or more first positions to one or more second positions that enable the one or more remote devices to obtain the image data that corresponds to the reference image data in accordance with the one or more control operations; and
- acquire the image data during the scheduled timeframe;

receiving the image data from the one or more remote devices;

modifying the electronic contract to include the image data, wherein the electronic contract comprises a blockchain, and wherein including the image data comprises adding the image data as a block to the blockchain;

determining, by the at least one processor and based on a comparison between the image data and the reference image data previously acquired by the one or more remote devices, that the one or more provisions have been fulfilled; and in response to determining that the one or more provisions have been fulfilled, causing, by the at least one processor, the one or more terms to be executed, wherein the one or more terms are executed by sending one or more commands to one or more payment systems to issue the one or more payments to an account associated with a fulfiller of the one or more provisions.

14. The method of claim 13, wherein the one or more remote devices comprise IoT devices.

15. The method of claim 13, wherein the instructions provide commands to remotely operate the one or more remote devices during the scheduled timeframe in which the one or more provisions is expected to be fulfilled.

16. The method of claim 13, wherein the instructions cause the one or more remote devices device to capture video or images during the scheduled timeframe in which the one or more provisions provision are expected to be fulfilled executed.

17. A non-transitory computer readable storage medium storing instructions that, when executed by at least one processor, cause the at least one processor to perform operations comprising:
- determining whether at least one individual is within a viewing range of at least one of one or more remote devices during an expected period of time, the one or more remote devices configured to monitor one or more properties of an area;
- identifying an electronic contract in response to determining that the at least one individual is within the viewing range of the at least one of the one or more remote devices during the expected period of time;
- accessing the electronic contract comprising one or more provisions for fulfilling the electronic contract and one or more terms for executing one or more payments, wherein the one or more provisions are indicative of:
  - the one or more remote devices for verifying that the one or more provisions are fulfilled;
  - reference image data previously acquired by the one or more remote devices; and
  - one or more control operations of the one or more remote devices for adjusting one or more first positions of the one or more remote devices to obtain image data representative of whether the one or more provisions are fulfilled during a scheduled timeframe;
- sending instructions to the one or more remote devices in response to determining that the at least one individual is within the viewing range of the at least one of the one or more remote devices during the expected period of time, the instructions configured to cause the one or more remote devices to:
  - move from the one or more first positions to one or more second positions that enable the one or more remote devices to obtain the image data that corresponds to the reference image data in accordance with the one or more control operations; and
  - acquire the image data during the scheduled timeframe;
- receiving the image data from the one or more remote devices;
- modifying the electronic contract to include the image data;
- determining, by the at least one processor and based on a comparison between the image data and the reference image data previously acquired by the one or more remote devices, that the one or more provisions have been fulfilled; and
- in response to determining that the one or more provisions have been fulfilled, causing, by the at least one processor, the one or more terms to be executed, wherein the one or more terms are executed by sending one or more commands to one or more payment systems to issue the one or more payments to an account associated with a fulfiller of the one or more provisions.

18. The system of claim 1, wherein the operations further comprise coordinating a modification of the electronic contract in response to determining that the one or more provisions have been fulfilled.

19. The system of claim 1, wherein the server system comprises a device control interface configured to control operations of the one or more remote devices.

20. The system of claim 19, wherein the device control interface comprises a database of scripts, devices profiles, communication protocols, or a combination thereof for controlling the operations of the one or more remote devices.

* * * * *